United States Patent
Tu (10) Patent No.: US 8,306,741 B2
(45) Date of Patent: Nov. 6, 2012

(54) METHOD AND APPARATUS FOR NAVIGATION SYSTEM USING ROUTING DATA CREATED BY REMOTE NAVIGATION SERVER

(75) Inventor: Ihung Tu, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 602 days.

(21) Appl. No.: 12/455,925

(22) Filed: Jun. 9, 2009

(65) Prior Publication Data

US 2010/0312465 A1    Dec. 9, 2010

(51) Int. Cl.
  *G01C 21/34* (2006.01)
  *G01C 21/26* (2006.01)
  *G01C 21/00* (2006.01)
(52) U.S. Cl. .................. 701/420; 701/468; 701/533
(58) Field of Classification Search .................. None
  See application file for complete search history.

(56) References Cited

U.S. PATENT DOCUMENTS

| | | | |
|---|---|---|---|
| 5,818,356 A * | 10/1998 | Schuessler | 340/995.12 |
| 6,636,805 B1 | 10/2003 | Tada et al. | |
| 6,691,028 B2 * | 2/2004 | Bullock et al. | 701/202 |
| 6,801,851 B2 * | 10/2004 | Kawakami | 701/209 |
| 6,904,362 B2 * | 6/2005 | Nakashima et al. | 701/211 |
| 7,233,862 B2 * | 6/2007 | Endo et al. | 701/209 |
| 2009/0150062 A1 | 6/2009 | Han | |

* cited by examiner

*Primary Examiner* — Michael J. Zanelli
(74) *Attorney, Agent, or Firm* — Muramatsu & Associates (57) ABSTRACT

A navigation method and apparatus uses routing data created by a remote navigation server for a route guidance operation by an individual navigation system. The navigation method and apparatus makes use of the most currently updated map data and the high calculation power of the remote navigation server for creating the calculated route and utilizes the calculated route for the route guidance operation by the individual navigation system. The navigation method and apparatus decreases an amount of routing data indicating the calculated route by employing a concept of strategic road segments for sending the routing data to the individual navigation system. The individual navigation system recreates the calculated route based on the routing data received from the navigation server for the route guidance operation to the destination.

18 Claims, 10 Drawing Sheets

METHOD AND APPARATUS FOR NAVIGATION SYSTEM USING ROUTING DATA CREATED BY REMOTE NAVIGATION SERVER

FIELD OF THE INVENTION

This invention relates to a method and apparatus for efficiently using routing data produced by a remote server, and more specifically, to a method and apparatus for a navigation system for making use of map data and calculation power of a remote navigation server for creating a calculated route and utilizing the calculated route represented by a small amount of map data for a route guidance by the user's navigation system.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, the navigation system notifies the user which direction to turn at the intersection.

When a destination is specified, the navigation system in the conventional technology creates a route to the destination based on map data stored therein and a navigation program and computer provided therein. In general, however, the computing power of a navigation system such as an automobile (vehicle) navigation system or portable navigation system is lower than that of a remote navigation server. This is because the computer in the vehicle navigation system or portable navigation system is designed for low cost and small size.

For an optimum performance of such a navigation system, it is required that the map data be updated frequently in order to reflect recent changes in the roads, new roads, development of new areas, etc. and to produce an accurate route. Moreover, for calculation of an optimum route to a selected destination, it is desirable that the processing speed of the navigation system be high enough. Thus, the navigation system must have a map database which is constantly updated and the high performance processor.

Because of such requirements, in the recent navigation systems, a remote navigation server with high computer power and updated map data is used for establishing a calculated route to the destination. The remote navigation server sends the required routing data to each user's navigation system. Thus, the user can make use of the calculated route created by the remote server based on the high computing power and the most recent map data.

In such a navigation system using the remote navigation server, it is desirable to minimize the amount of routing data sent from the remote navigation server to the individual navigation system.

SUMMARY OF THE INVENTION

It is, therefore, an object of the present invention to provide a method and apparatus for a navigation system which is capable of efficiently using routing data produced by a remote navigation server for a route guidance operation of an individual navigation system.

It is another object of the present invention to provide a method and apparatus for a navigation system for making use of the most currently updated map data and the high calculation power of a remote navigation server for creating a calculated route and utilizing the calculated route for a route guidance operation by an individual navigation system.

It is a further object of the present invention to provide a method and apparatus for a navigation system for decreasing an amount of routing data indicating a calculated route by employing a concept of strategic road segments for sending the routing data to an individual navigation system.

It is a further object of the present invention to provide a method and apparatus for a navigation system for recreating a calculated route by an individual navigation system based on the routing data received from the navigation server for a route guidance operation of the individual navigation system.

One aspect of the present invention is a method for using routing data produced by a remote navigation server by an individual navigation system. The method includes the steps of: sending information on a starting point and a destination point to the navigation server from the individual navigation system through a communication network; establishing an optimum route by the navigation server by conducting a route search algorithm on map data retrieved from a map database of the navigation server; determining a road type involved in the optimum route and selecting strategic road segments associated with the optimum route; storing data related to the selected strategic road segments while ignoring data related to road segments other than the strategic road segments; establishing routing data based on the data related to the strategic road segments thereby creating routing data of minimum amount of data; sending the routing data from the navigation server to the individual navigation system through the communication network; and reproducing the optimum route by the individual navigation system based on the routing data and map data retrieved from a map database of the individual navigation system.

The navigation method of the present invention further includes a step of repeating the step of determining the road type and selecting the strategic road segments and the step of storing data related to the selected strategic road segments between the start point and the destination point of the optimum route.

In the present invention, the step of determining the road type involved in the optimum route and selecting the strategic road segments associated with the optimum route includes a step of detecting a freeway in the optimum route and selecting a freeway ramp as a strategic road segment for the routing data when the freeway ramp either enters or exits the freeway on the optimum route.

In the present invention, the step of determining the road type involved in the optimum route and selecting the strategic road segments associated with the optimum route includes a step of detecting a surface road in the optimum route and selecting a road segment that changes a direction of the optimum route such that it destroys assumption that the optimum route is a straightest path as a strategic road segment for the routing data.

In the navigation method, the routing data indicating the optimum route include at least information on absolute locations of end nodes of the strategic road segments associated with the optimum route.

In the present invention, the step of reproducing the optimum route by the individual navigation system includes a step of filling-in the routing data with road segments retrieved from the map database of the individual navigation system thereby reproducing the optimum route by the individual navigation system.

In the present invention, the individual navigation system includes a position detection unit to detect a current position of the individual navigation system where the position detection unit includes at least a GPS (Global Positioning System) receiver for determining the position based on GPS signals from artificial satellites. The individual navigation system conducts a route guidance operation to the destination through the optimum route reproduced based on the routing data from the navigation server while comparing the current position detected by the position detection with the optimum route.

In the navigation method of the present invention, the map data used by the navigation server is updated repeatedly to reflect the most current map information in formation of the optimum, and a computation power of the navigation server is higher than that of the individual navigation system.

Another aspect of the present invention is a navigation apparatus for efficiently using the routing data produced by the remote navigation server for a route guidance operation of the individual navigation system. The apparatus is configured by various means for implementing the operational steps defined in the method invention noted above. Thus, the apparatus of the present invention makes use of the most currently updated map data and the high calculation power of the remote navigation server for creating the calculated route which is described by the minimum amount of data and utilizes the calculated route for the route guidance operation by the individual navigation system.

According to the present invention, the method and apparatus for a navigation system is capable of efficiently using the routing data produced by the remote navigation server for a route guidance operation of the individual navigation system. The method and apparatus of the present invention makes use of the most currently updated map data and the high calculation power of the remote navigation server for creating the calculated route and utilizes the calculated route for the route guidance operation by the individual navigation system. The method and apparatus of the present invention decreases an amount of routing data indicating the calculated route by employing a concept of strategic road segments for sending the routing data to the individual navigation system. The individual navigation system recreates the calculated route based on the routing data received from the navigation server for the route guidance operation to the destination.

BRIEF DESCRIPTION OF THE DRAWINGS

FIGS. 4A to 4C are schematic map views to describe the steps of creating the routing data with respect to surface streets in the present invention that minimizes the amount of routing data where

DETAILED DESCRIPTION OF THE PREFERRED EMBODIMENT

The method and apparatus of the present invention related to an overall navigation system will be described in detail with reference to the accompanied drawings. The present invention is designed to produce routing data indicating an optimum route to a destination by a navigation server for use by an individual navigation system. The routing data is configured by a minimum amount of data so that the routing data is transmitted to the individual navigation system easily and quickly.

The method and apparatus of the present invention makes use of the most currently updated map data and the high calculation power of the remote navigation server for creating the calculated route and utilizes the calculated route for the route guidance operation by the individual navigation system. The method and apparatus of the present invention decreases an amount of routing data indicating the calculated route by employing a concept of strategic road segments for sending the routing data to the individual navigation system. The individual navigation system reproduces the calculated route based on the routing data received from the navigation server for the route guidance operation to the destination.

In the following description, an embodiment of the present invention will be directed mainly with respect to a vehicle navigation system that receives routing data from a remote navigation server. However, the principle of the method and apparatus of the present invention can be applied to many configurations other than the vehicle navigation system. For example, the present invention can be applied to a portable navigation device, an electronic device with a navigation function, such as PDA, laptop computer, etc.

Figure 1:
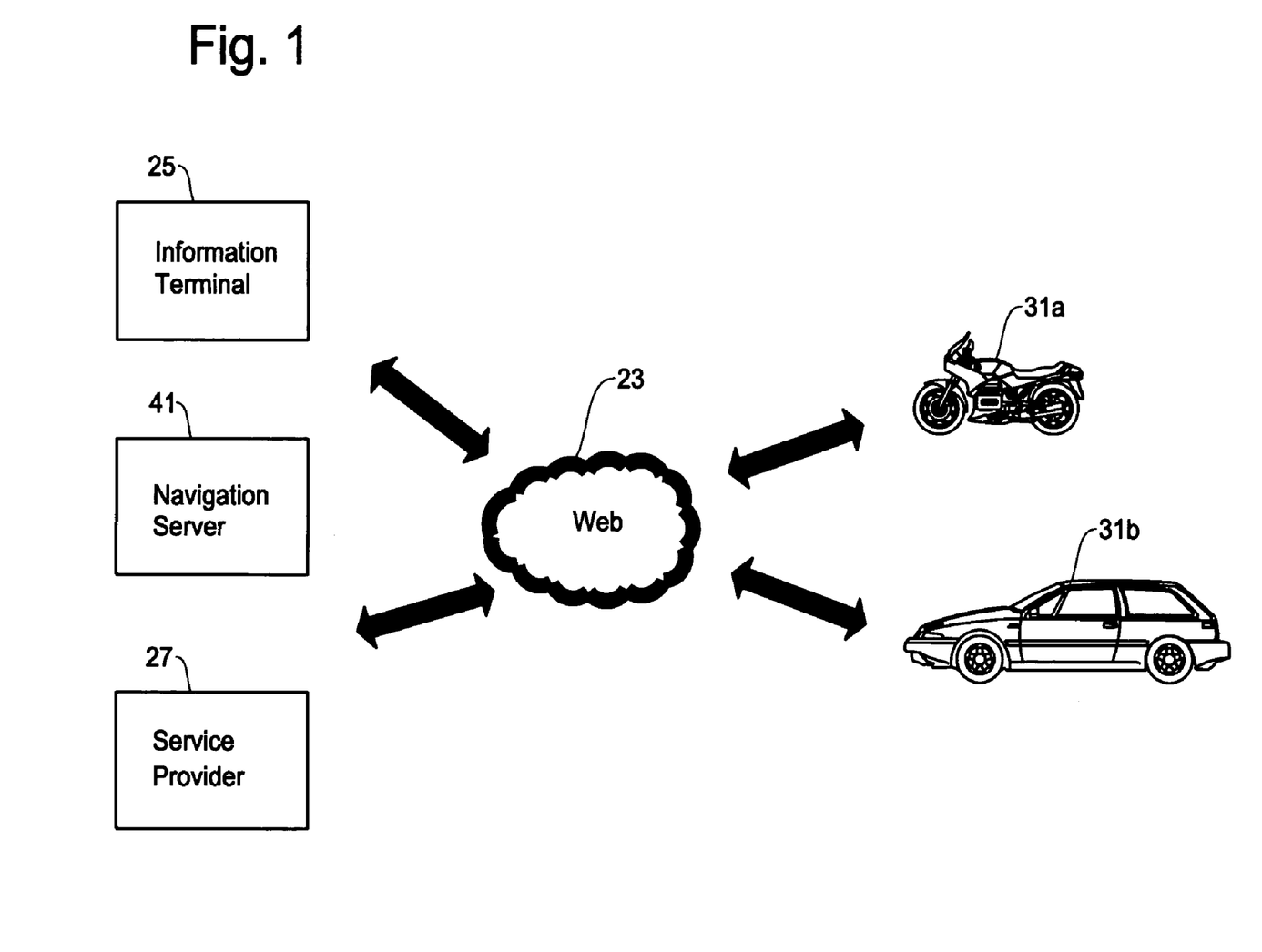
FIG. 1 is a schematic diagram showing an example of overall configuration associated with the present invention where individual navigation systems are able to access a remote navigation server and other service providers through wireless or wired network.

FIG. 1 is a schematic diagram showing an overall configuration associated with the present invention where individual navigation systems are able to access a remote navigation server and other service providers through wireless or wired communication network. As is known in the art, a traditional navigation system includes a map database, navigation programs, and a process for calculating and determining an optimum route to a destination is conducted by the navigation system itself. Thus, without needs of assistance from an outer source, the navigation system examines and establishes an optimum route to the destination and guides the user to the destination through the optimum route.

In the present invention, however, the operation for route calculation is done by a remote navigation server which has a processor with a computing power superior to that in an individual navigation system. Further, the map database in the remote navigation server is constantly updated to reflect the most current situations of roads, POIs (points of interest), regulations, etc. In such a configuration, an optimum route can be created with high accuracy and high speed by the remote navigation server. The route thus created can be used by an individual navigation system with a small scale and low cost without needs of frequent updating the map database.

As shown in FIG. 1, in the present invention, the overall system includes individual navigation systems 31a and 31b, typically mounted on vehicles, and a navigation server 41. The configuration of FIG. 1 also shows an information terminal 25 which is typically a terminal of a map data provider, and a service provider 27 which is, for example, a traffic information server, a weather information server, recreational information server, etc. The individual navigation systems 31a and 31b are able to communicate with the navigation server 41 via a communication network (Web or internet) 23 by means of, for example, wireless communication devices.

The navigation server 41 stores the most recent map data and is able to calculate a route based on information regarding a starting point and a destination point provided by the individual navigation system 31a or 31b. The information terminal 25 is used to update the information in the map database in the navigation server 41. the navigation server 41 further retrieves traffic information, weather information, etc., from the service provider 27 so that it can provide the high quality service to the users of the individual navigation systems 31a and 31b.

Figure 2:
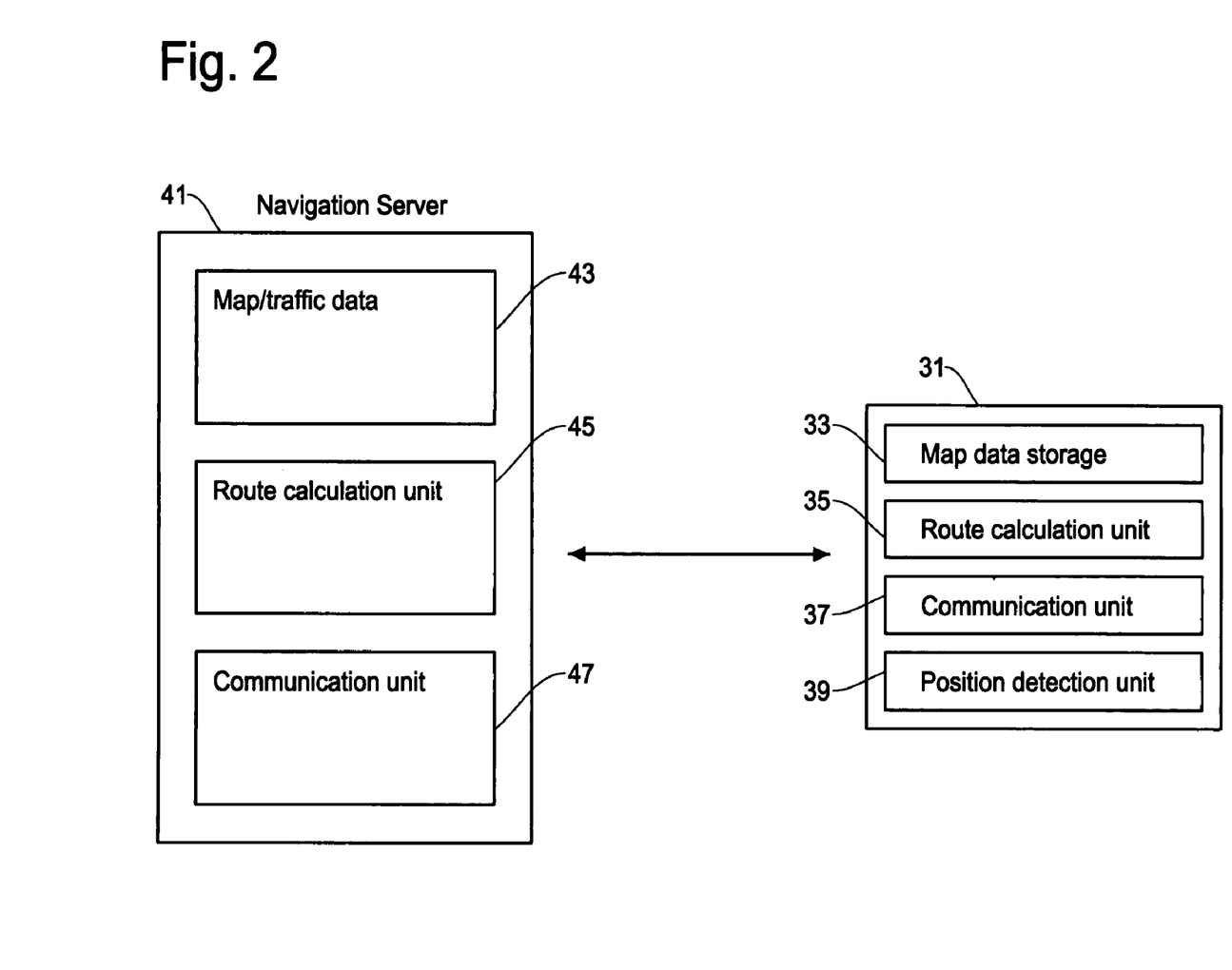
FIG. 2 is a schematic diagram showing an example of a basic structure of a navigation server and an individual navigation system for implementing the present invention.

FIG. 2 is a schematic diagram showing an example of a basic structure of a navigation server and an individual navigation system for implementing the present invention. As shown, the basic components of the present invention are an individual navigation system 31 such as a user's vehicle navigation system, and a navigation server 41 which is remotely located from the user and is accessible through the communication network (FIG. 1). As noted above, in the present invention, an optimum route to the destination requested by the user of the individual navigation system 31 is created by utilizing the map database and the computing power of the remote navigation server 41. The routing data indicating the optimum route is transmitted from the navigation server 41 to the user via the communication network for the route guidance operation of the individual navigation system 31.

In the example of FIG. 2, the navigation server 41 includes a map/traffic database 43 which stores the most current map data, a route calculation unit 45 which calculates an optimum route between a start point and a requested destination with a high computing power, and a communication unit 47 for communication with the individual navigation systems 31. The individual navigation system 31 has a map data storage 33 for storing map data, a route calculation unit 35, and a communication unit 37 for communication with the navigation server 41. Thus, the components in the individual navigation system 31 and the navigation server 41 are functionally similar to one another although the components in the navigation server 41 have higher performance capabilities than that of the individual navigation system.

The individual navigation system 31 also has a position detection unit 39 that is used to detect the current position of a user. A typical example of the position detection unit 39 is a global positioning system ("GPS") receiver using the GPS signals from artificial satellites, and sensors installed in a vehicle such as a speed pulse meter, gyroscope, etc. Thus, once the optimum route to the destination is created by the navigation server 41, the individual navigation system 31 is able to follow the optimum route by detecting the current position with reference to the map data from the map data storage 33.

As noted above, the navigation server 41 has an advantage over the individual navigation system 31 in that the computing power is generally more superior, the map/traffic data used for route calculation is the newest or most current. The route calculation algorithm with more advanced and complicated type will be used because of the superior computation power. Thus, in order to take advantage of the high performance capability of the navigation server 41, as shown in FIG. 1, each of the navigation systems 31a and 31b uses the navigation server 41 for the route calculation via internet 23.

The individual navigation system 31, which is typically a vehicle navigation system or a portable navigation device, receives user's input for a destination. As noted above, the current location of the user is detected by the position detection unit 39. The individual navigation system 31 sends the information on the current location and the destination to the navigation server 41 via the wireless communication network (internet) 23, etc.

The navigation server 41 calculates a route between the current user location and the destination and sends the resultant data (routing data) to the individual navigation system 31. In sending the routing data to the individual navigation system 31, it is desirable that the routing data be compact enough so that the data transfer to the individual navigation system 31 can be completed within a short time. Moreover, it is desired that the individual navigation system 31 can accurately reproduce the calculated route from the received routing data.

In order to minimize the amount of data and, at the same time, allows accurate reconstruction of the calculated route, the present invention uses a concept of strategic road segment. The strategic road segment is a method for focusing on a road segment that forces a particular routing to match the original routing established by the navigation server 41. By incorporating the idea of the strategic road segment, the information on road segments other than the strategic road segment become less significant and its data can be reduced or even be omitted, thereby reducing the overall amount of routing data to be sent to the individual navigation system 31.

The concept of the strategic road segments in accordance with the present invention will be described with reference to the schematic map view of FIG. 3. In this example, the map view includes a freeway which is formed with a plurality of freeway road segments 51a-51h which is a typical way of establishing a road in the map data. On the freeway, there are freeway (entrance or exit) ramps represented by road segments 53a-53g for accessing the corresponding surface roads.

Here, it is assumed that the routing (a process for finding a route) generally starts from the road segment 51a and ends at the road segment 51h of the freeway. It is also assumed that a part of the calculated route established by the remote navigation server 41 runs from the road segment (freeway ramp) 53a connected to "El Segundo", freeway road segments 51b, 51c, 51d, 51e, 51f, 51g, and the road segment (freeway ramp) 53g connected to "Crenshaw". Although such routing data can be formulated by listing all the map data related to the road segments, such a way of forming the routing data would require a large amount of data.

Figure 3:
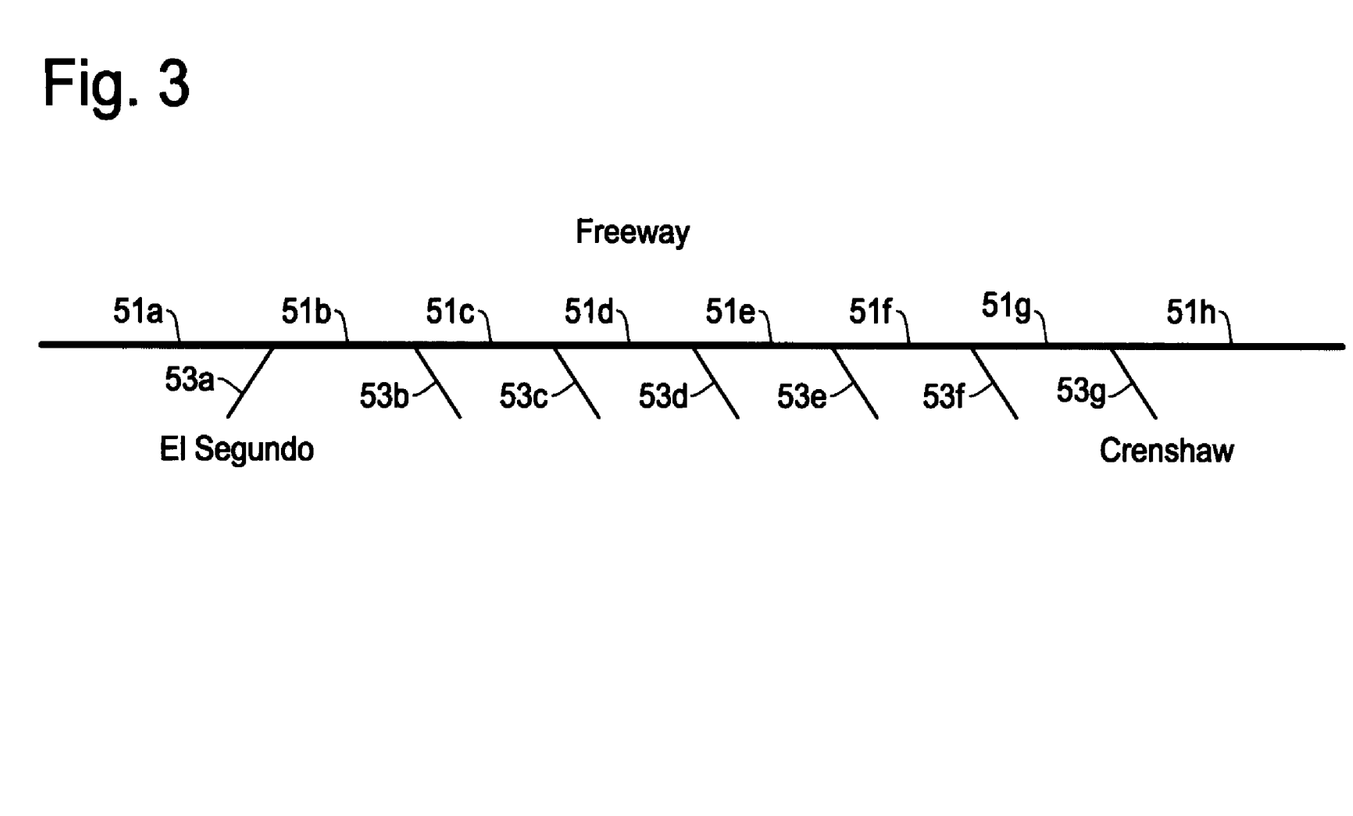
FIG. 3 is a schematic diagram showing an example of road connections having a freeway and ramps to and from the freeway to describe the concept of producing routing data in the present invention.

In this routing example of FIG. 3 involving a freeway, strategic road segments are freeway ramp, which are the road segments 53a and 53g. This is because, as long as the road segments 53a and 53g are known, the individual navigation system 31 can recreate the route intended by the navigation server 41 by continuously using the freeway. In other words, the freeway ramp that either enters or exits the freeway on the optimum (calculated) route is the most important road segments for reproducing the optimum route while other road segments can be ignored.

Thus, there is no need to include the information on each and every freeway road segment between those freeway ramps 53a and 53g in the routing data, which can reduce the amount of routing data to be transferred from the navigation server 41 to the individual navigation system 31. As will be described with reference to FIG. 4C, each road, either a surface street or a freeway, is expressed by a plurality of road segments (links). Further, as is known in the art, each road segment has end nodes whose absolute position is expressed by latitude and longitude data.

Figure 4A:
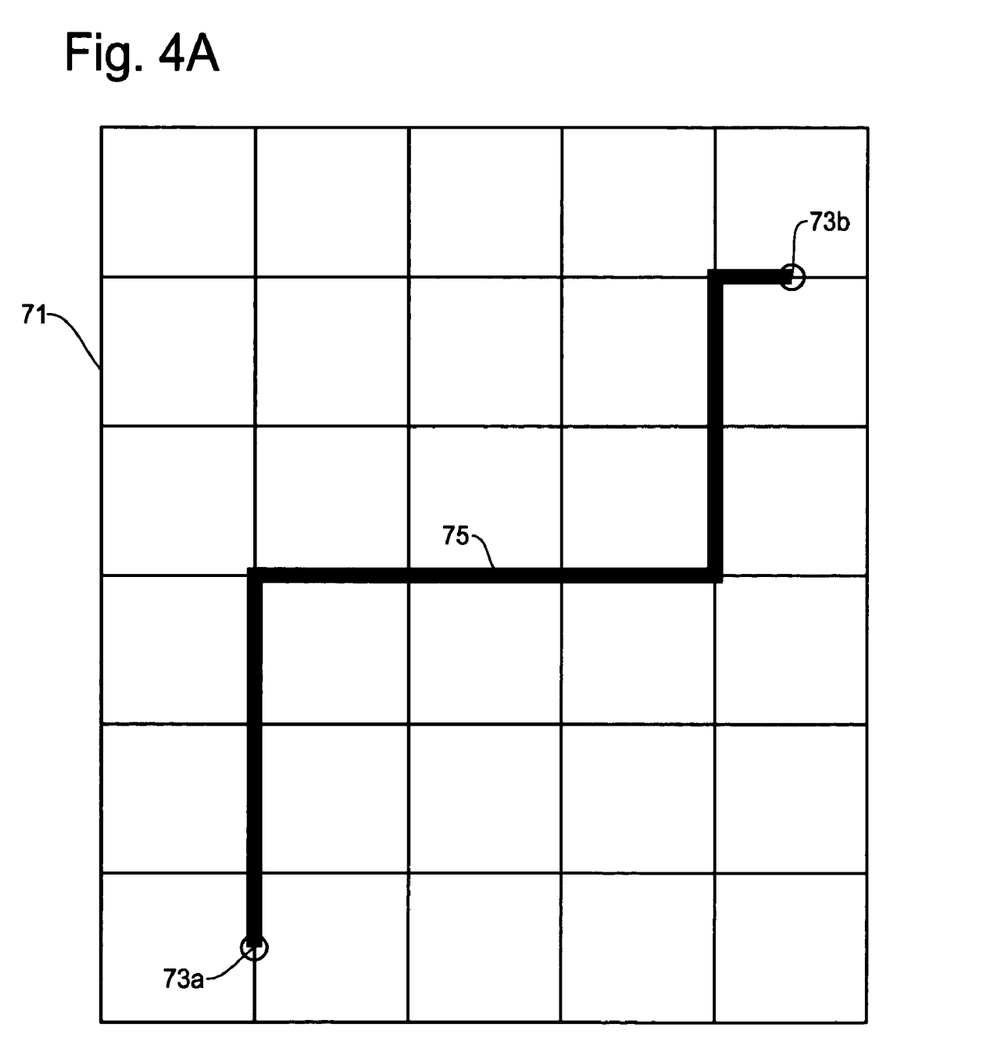
FIG. 4A shows a route to the destination calculated by the navigation server.
Figure 4B:
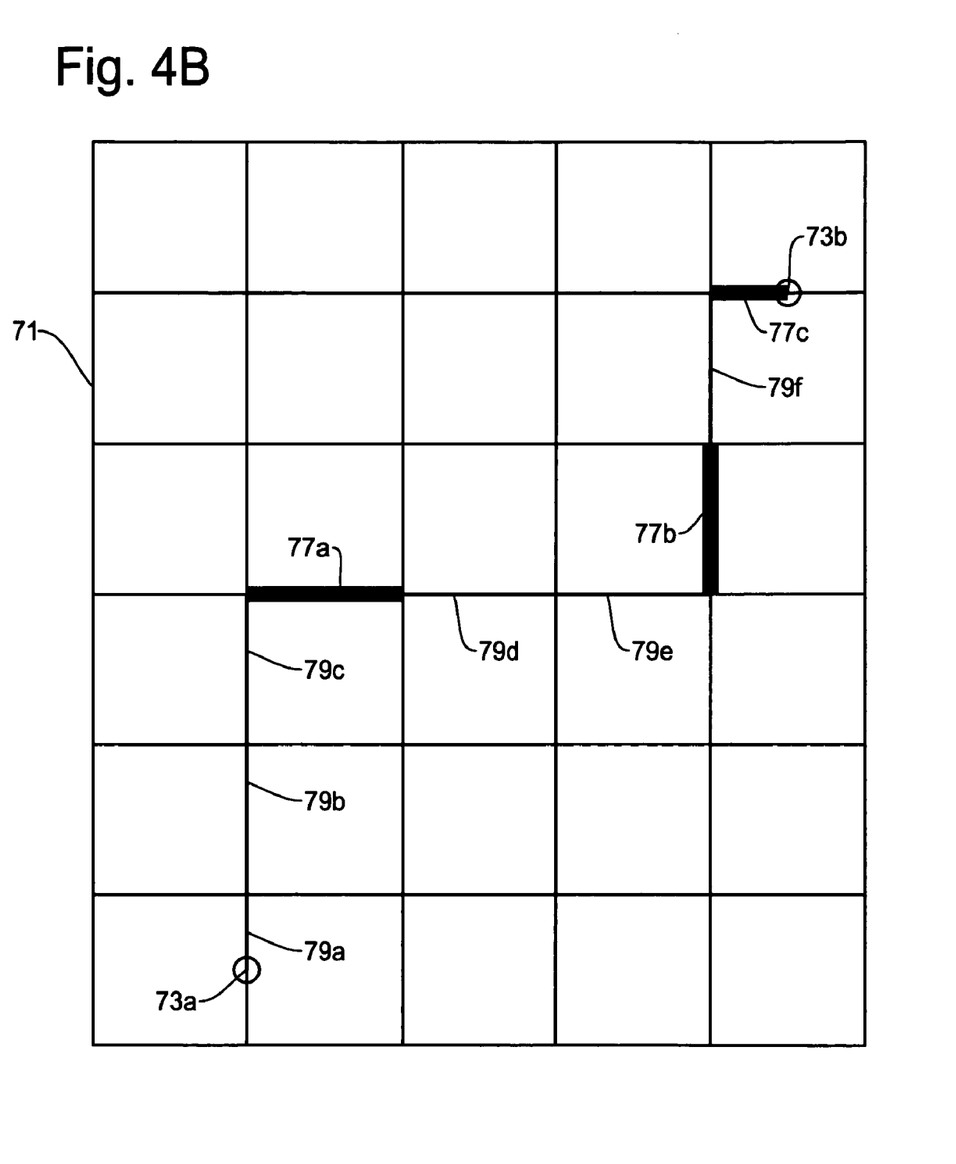
FIG. 4B is similar to FIG. 4A except that only strategic road segments on the route are shown by bold lines.
Figure 4C:
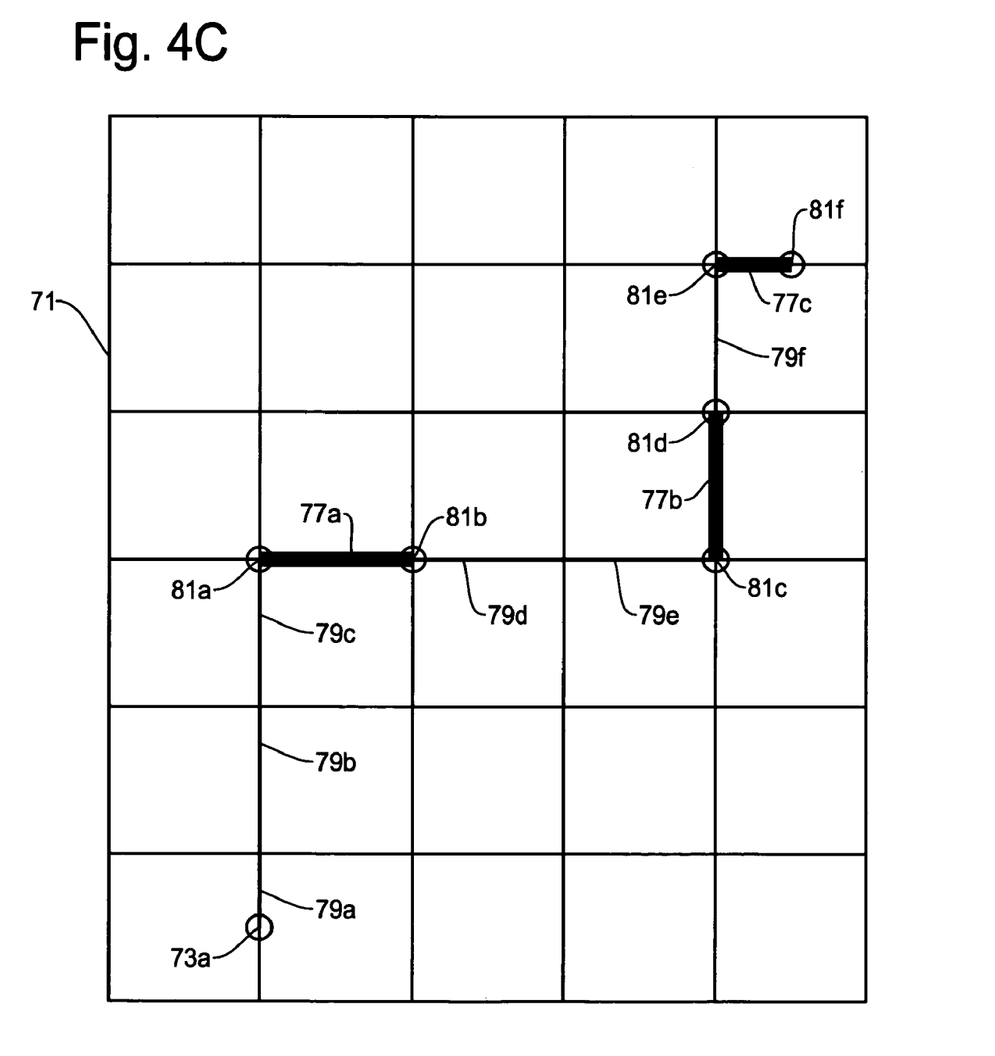
FIG. 4C is similar to FIG. 4B except that each strategic segment on the route is marked by nodes at both ends.

FIGS. 4A-4C are schematic diagrams showing an example of a road network configured by a plurality of surface streets to describe the concept of the present invention for selecting strategic road segments. In this example, a road network 71 is structured in a lattice manner (network) where each line of each lattice is considered as a road segment for an illustration purpose. The map views of FIGS. 4A-4C show a calculated route 75 that starts from the starting point 73a and ends at the destination point 73b.

In the present invention, the calculated route 75 is established by the navigation server 41 in a manner shown in FIG. 4A. The routing data indicating the calculated route 75 must be sent to the individual navigation system 31 so that the individual navigation system 31 is able to reproduce the route 75 and guide the user to the destination 73b. Thus, the routing data required for the individual navigation system 31 to recreate the route 75 is sent to the individual navigation system 31.

To minimize the amount of data to be transmitted from the navigation server 41 to the individual navigation system 31, the idea of strategic route segments will be used as described with reference to FIGS. 4B and 4C. FIG. 4B is similar to FIG. 4A except that only strategic road segments of the calculated route 75 are shown by bold lines. In this example, three strategic road segments 77a, 77b, and 77c are illustrated by thick lines, and the other parts of the route 75 are missing.

FIG. 4C is similar to FIG. 4B except that each strategic segment is marked by end point marks (end nodes) at both ends. As is known in the art, in the map data for a navigation system, each road is expressed by a plurality of road segments (links) where each road segment has end nodes whose absolute position is expressed by latitude and longitude data. Thus, the strategic road segment 77a has end nodes 81a and 81b, the strategic road segment 77b has end nodes 81c and 81d, and the strategic road segment 77c has end nodes 81e and 81f, respectively.

If the strategic road segments are known, the individual navigation system 31 is able to recreate the calculated route without needs of receiving the data on the other road segments on the calculated route. For route reconstruction, a straightest path is preferred until a deviation point which is typically an end node of the strategic road segment. In the case of FIG. 4C, from the start point 73a, the individual navigation system 31 calculates a route upwardly to the end node 81a of the strategic road segment 77a.

In other words, so long as the information on the end node 81a and the strategic road segment 77a is given, the individual navigation system 31 is able to recreate the straightest path between the starting point 73a and the road segment 77a. In recreating the route, the individual navigation system 31 retrieves the road segments 79a, 79b, and 79c from the map data storage 35 to fill-in the gap of the routing data from the navigation server. Since the strategic road segment 77a changes the direction toward right, it is essential for recreating the route 75, thus has to be included in the routing data to be transmitted to the individual navigation system 31.

Similarly, after the strategic road segment 77a changes the direction of the route, another assumption of straightest path is made so that the route will be generated to the next strategic road segment 77b. Thus, without need of receiving the information on the road segments 79d and 79e in the routing data from the navigation server 41, the individual navigation system 31 is able to recreate the route between the road segments 77a and 77b with use of the map data from its own map database. As noted above, the individual navigation system 31 retrieves the map data of the road segments 79d and 79e to fill-in the gap in the routing data from the navigation server 41.

The strategic road segment 77b changes the route direction to the upward direction and a further assumption of straightest path is made so that the route will be generated to the next strategic road segment 77c. Thus, the routing data sent to the individual navigation system 31 will not include the data of the road segment 79f, which is added to the routing data by the individual navigation system 31. Since only three road segments 77a, 77b and 77c are necessary, the amount required for transmitting the routing data from the navigation server 41 to the individual navigation system 31 is reduced significantly.

Figure 5:
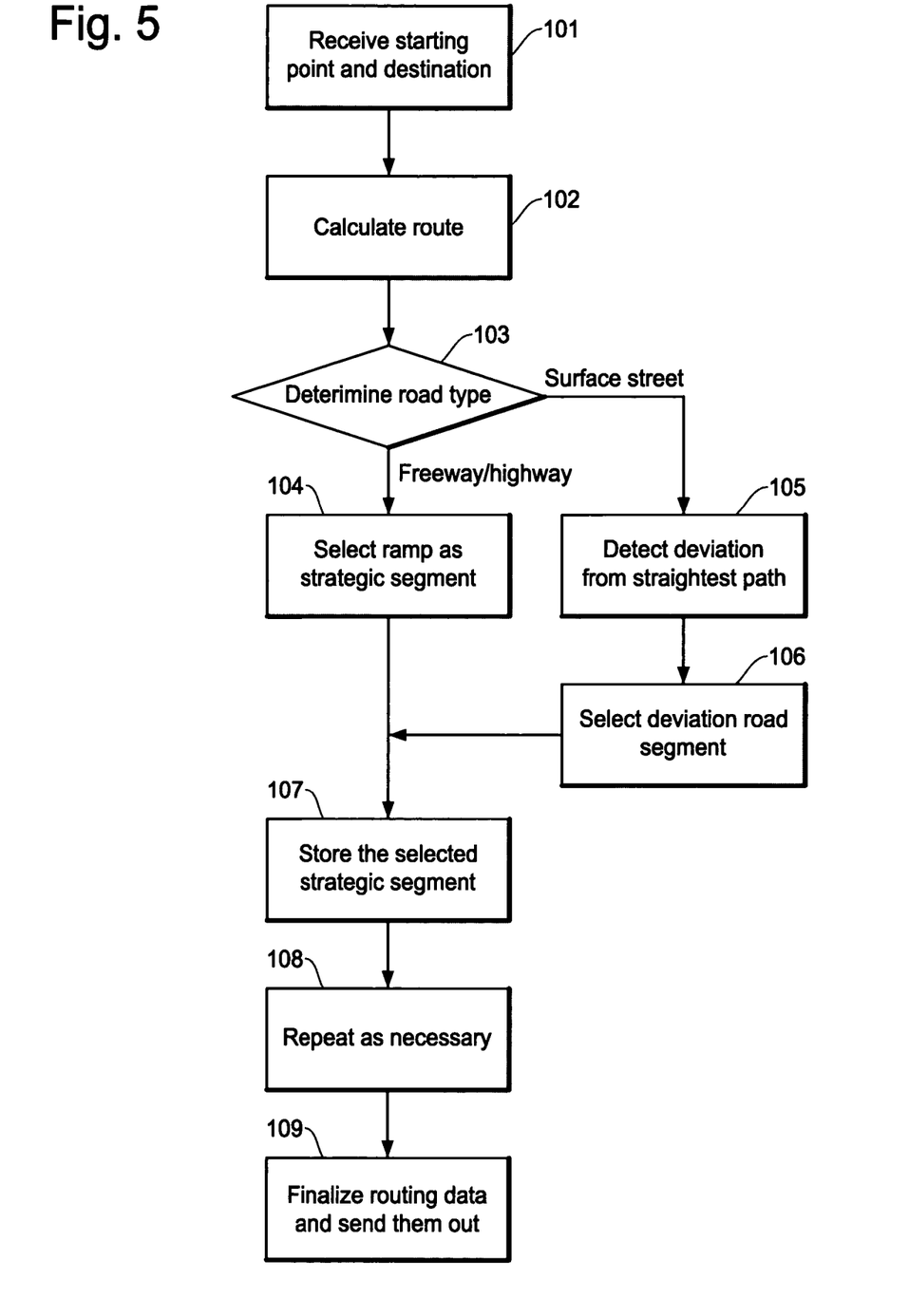
FIG. 5 is a flow chart showing an example of operational steps for creating the routing data that minimizes the amount of data to be transmitted to the individual navigation system in the present invention.

FIG. 5 is a flow chart showing an example of operational steps for creating the routing data that minimizes the amount of data to be transmitted to the individual navigation system in the present invention. In the first step 101, the navigation server 41 receives the information regarding the current position and the destination from the individual navigation system 31. Thus, in step 102, the navigation server 41 calculates an optimum route from the starting point to the destination point specified by the individual navigation system 31. The route calculation can be performed by such algorithms as an A* search algorithm, Dijkstra algorithm, or Floyd-Warshall algorithm, and other variants known in the art.

As noted above, the navigation server 41 generally has the higher computing power and the more completely updated database than those of the individual navigation system 31 for the route calculation operation. As the route has been calculated, the navigation server 41 starts determination of road type from the starting point to the destination in step 103 for the purpose of creating the routing data with minimum amount of data. In the step 103, if the road involved in the calculated route is a freeway, ramps on the freeway that access the surface streets are selected with respect to the calculated route in step 104.

In the step 103, if the road involved in the calculated route is related to the connection to the surface streets, the navigation server 41 will determine the point where the route deviates from a straightest path of the freeway in step 105. The deviation road segment (freeway ramp) is selected as a strategic road segment in step 106 and the road segments of the freeway between the strategic road segment are ignored. In step 107, the strategic road segments selected in the previous steps are stored for creating the routing data.

In step 108, the above procedure is repeated as necessary to cover the entire calculated route produced in the step 102 noted above. As a result, only certain road segments are recognized as the strategic road segments while other road segments are ignored or deleted from the calculated route. Accordingly, in step 109, the routing data to be sent to the individual navigation system 31 is completed and sent out where the overall amount of the routing data is dramatically reduced from that of the originally calculated route.

Referring back to FIGS. 4A to 4C, the data required for recreating the route is comprised of the strategic road segment 77a with the end nodes 81a and 81b, the road segment 77b with the end nodes 81c and 81d, and the road segment 77c with the end nodes 81e and 81f. Each strategic road segment has end nodes (end points) each being defined by coordinates or geographic information. The order of following the strategic road segments is also defined in the routing data which may be defined by pointing the next strategic road segment from the previous strategic road segment.

Figure 6:
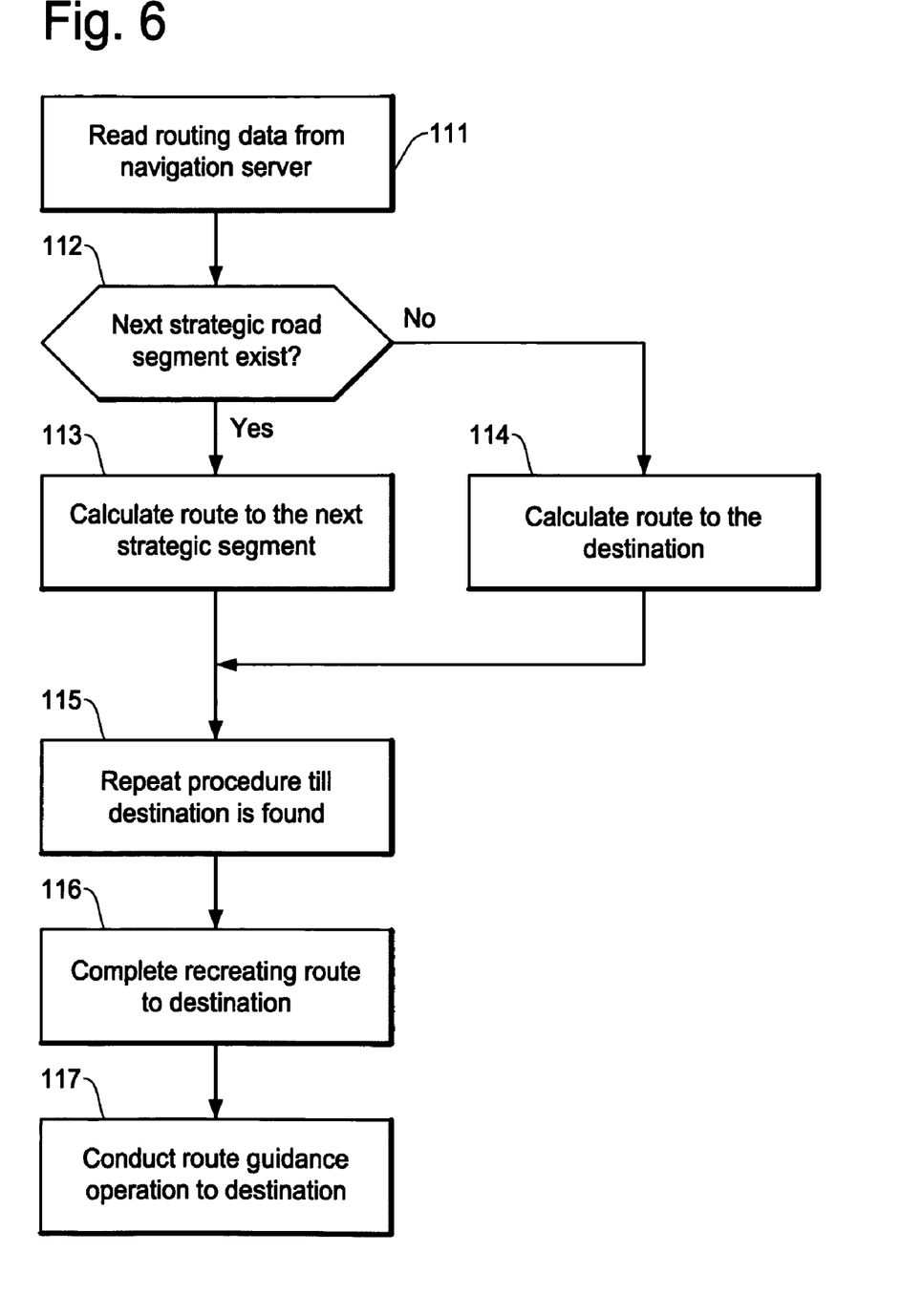
FIG. 6 is a flow chart showing an example of operational steps for recreating a calculated route in the individual navigation system based on the routing data from the navigation server in the present invention.

FIG. 6 is a flow chart showing an example of operational steps for recreating a calculated route in the individual navigation system based on the routing data from the navigation server in the present invention. Having received the routing data from the navigation server 41, in step 111, the individual navigation system 31 first reads the routing data. In step 112, from the starting point, the individual navigation system 31 determines whether there is a strategic road segment in the routing data.

In the example described with reference to FIGS. 4B and 4C above, the first strategic road segment is the road segment 77a, followed by road segments 77b and 77c. Thus, in the step 112, the road segment 77a will be selected first as the strategic road segment. As noted above, the data indicating the road segment include data regarding absolute positions of the end nodes or the road segment. Thus, the individual navigation system 31 is able to find the road segments from its map database that should be between the starting point and the strategic road segment 77a. Accordingly, in step 113, the individual navigation system 31 calculates a route from the starting point to the strategic road segment 77a in step 113.

If a strategic road segment is not found in the step 112, the individual navigation system 31 calculates a route to the final destination in step 114 based on the routing data. In the step 113 where a route is calculated to the next strategic segment noted above, typically, the individual navigation system 31 calculates the route to an end node of the strategic road segment that is closer to the starting point or previous point. In the alternative, the routing data may indicate which end node of the strategic route segment is set as a temporary destination for the next strategic road segment.

In step 115, the above described procedure is repeated for each of the remaining strategic road segments until the final destination is found. Thus, in step 116, the individual navigation system 31 completes the process of recreating the calculated route based on the routing data received from the navigation server 41. The individual navigation system 31 conducts the route guidance to the destination based on the recreated calculated route.

Figure 7:
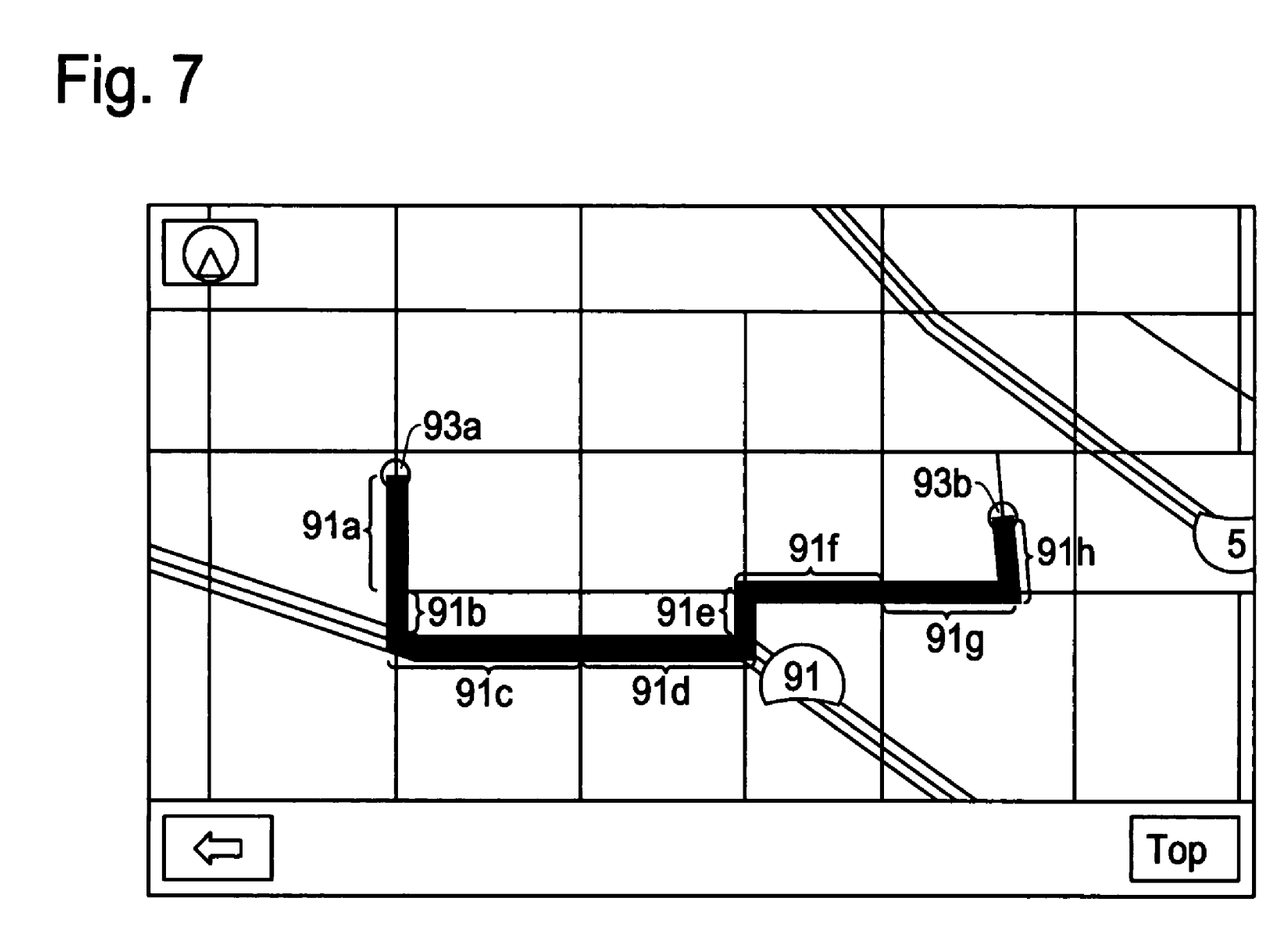
FIG. 7 is a schematic map view showing an example of a route involving a freeway and surface streets established by the routing operation of the navigation server in accordance with the present invention.

FIG. 7 is a schematic map view showing an example of a calculated route involving a freeway I-91 and several surface streets established by the routing operation of the navigation server 41 (FIG. 2) in accordance with the present invention. From the start point 93a to the destination point 93b, the calculated route is comprised of road segments 91a, 91b, 91c, 91d, 91e, 91f, 91g and 91h. The route starts from the road segment 91a where the next road segment 91b is a freeway ramp, i.e., a road segment to enter the freeway I-91.

The road segment 91e is also a freeway ramp, i.e., a road segment to exit the freeway I-91 to reach the surface street. In this example, the road segments necessary for routing of the calculated route are the road segments 91b, 91e, 91f, and 91h, i.e., strategic road segments in the present invention. The freeway ramps 91b and 91e are strategic road segments that changes the assumption that the intended route continuously uses the freeway. Further, the road segments 91f and 91h are strategic road segments that change the direction of the route.

Figure 8:
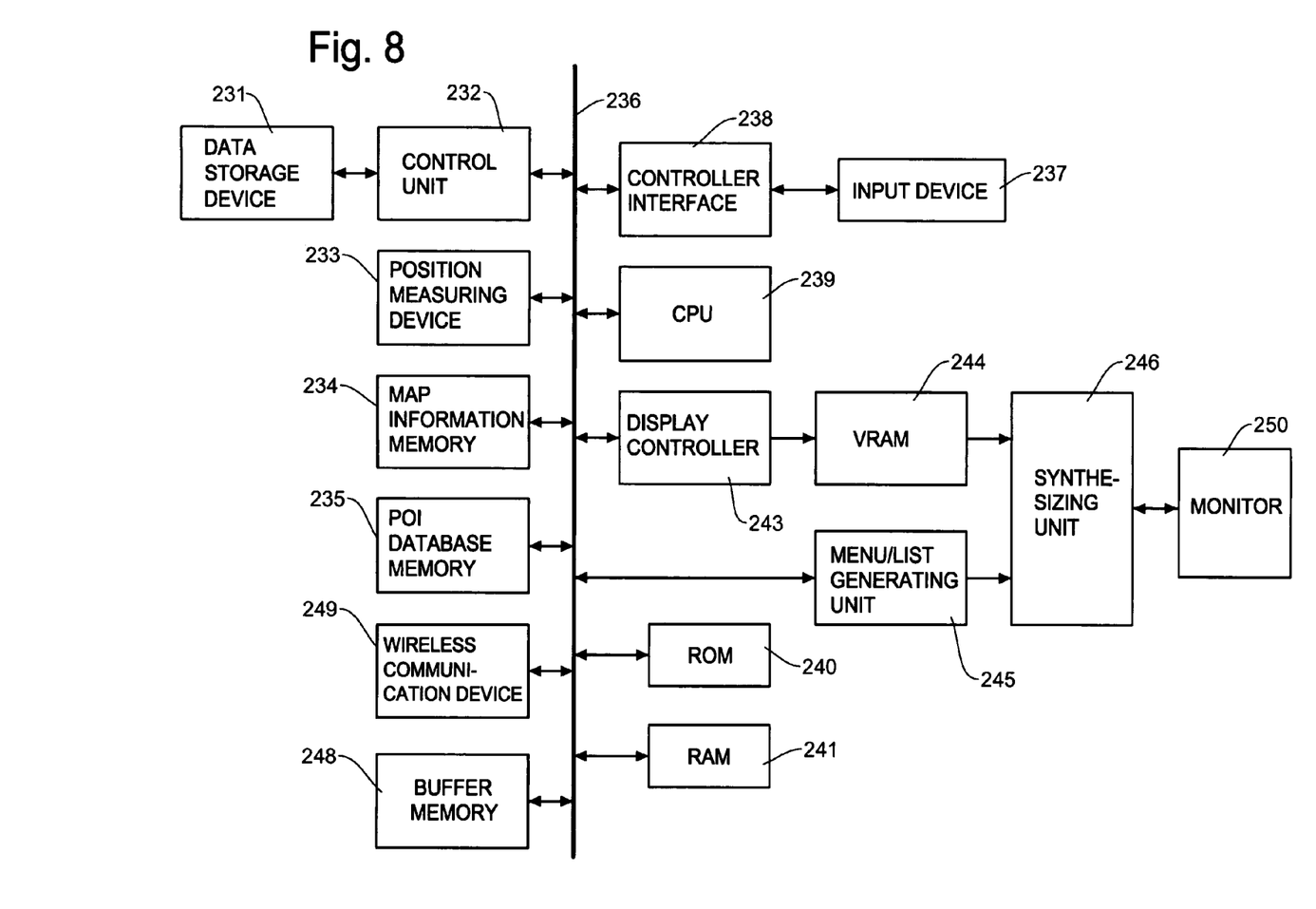
FIG. 8 is a functional block diagram showing an example of structure of a vehicle navigation system implementing the present invention.

FIG. 8 is a block diagram showing an example of structure of a vehicle navigation system for implementing the present invention. The embodiment structure shown in FIG. 8 acts as an individual navigation system 31 noted above that receives the routing data from the navigation server 41 in FIG. 2. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage device 231 such as a hard disc, CD-ROM, DVD, memory device or other storage means for storing the map data. The navigation system includes a control unit 232 for controlling an operation for reading the information from the data storage device 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for receiving GPS signals from artificial satellites, and etc.

The block diagram of FIG. 8 further includes a map information memory 234 for storing the map information which is read from data storage device 231, a database memory 235 for storing database information such as point of interest (POI) information which is read out from the data storage device 231, an input device 237 for executing a menu selection operation, an enlarge/reduce operation, a destination input operation, etc. and a controller interface 238. The input device 237 can be a touch screen or multi-touch device formed on a monitor screen.

In FIG. 8, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image on the basis of the map information, a VRAM 244 for storing images generated by the display controller 243, a menu/list generating unit 245 for generating menu image/various list images, a synthesizing unit 246, a wireless transmitter 249 for wireless communication to retrieve data from a remote server, especially from the navigation server 41 as shown in FIGS. 1 and 2, a buffer memory 248 for temporally storing data, and a monitor screen (display) 250.

The wireless communication device 249 is used for transmission of routing data between the navigation server 41 and the individual navigation system 31. The embodiment structure shown in FIG. 8 (individual navigation system 31) sends route specification data that defines the starting point and destination to the navigation server 41 in FIG. 2. The navigation server 41 calculates the route to the destination and performs the procedure described in the flow chart of FIG. 5 to minimize the amount of routing data. The navigation server 41 will transmit the resultant routing data to the individual navigation system 31 such as vehicle navigation system of FIG. 8.

The procedures described in the flow chart in FIG. 6 is performed by the CPU 239 in the individual navigation system 31. As a result, the calculated route can be recreated in the individual navigation system 31. Based on the recreated route, the navigation system performs the route guidance operation to the destination. The whole procedure may be repeated during the route guidance to provide a better route reflecting the current and future traffic information, weather, etc.

As has been described above, according to the present invention, the method and apparatus for a navigation system is capable of efficiently using the routing data produced by the remote navigation server for a route guidance operation of the individual navigation system. The method and apparatus of the present invention makes use of the most currently updated map data and the high calculation power of the remote navigation server for creating the calculated route and utilizes the calculated route for the route guidance operation by the individual navigation system. The method and apparatus of the present invention decreases an amount of routing data indicating the calculated route by employing a concept of strategic road segments for sending the routing data to the individual navigation system. The individual navigation system recreates the calculated route based on the routing data received from the navigation server for the route guidance operation to the destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for using routing data created by a remote navigation server for a route guidance operation by an individual navigation system, comprising the following steps of:
   sending information on a starting point and a destination point to the navigation server from the individual navigation system through a communication network;
   establishing an optimum route by the navigation server by conducting a route search algorithm on map data retrieved from a map database of the navigation server;
   determining a road type involved in the optimum route and selecting strategic road segments associated with the optimum route;
   storing data related to the selected strategic road segments while ignoring data related to road segments other than the strategic road segments;
   establishing routing data based on the data related to the strategic road segments thereby creating routing data of minimum amount of data;
   sending the routing data from the navigation server to the individual navigation system through the communication network; and
   reproducing the optimum route by the individual navigation system based on the routing data and map data retrieved from a map database of the individual navigation system;
   wherein said step of determining the road type involved in the optimum route and selecting the strategic road segments associated with the optimum route includes a step of detecting a surface road in the optimum route and selecting a road segment that changes a direction of the optimum route such that it destroys assumption that the optimum route is a straightest path as a strategic road segment for the routing data.

2. A navigation method as defined in claim 1, further comprising a step of repeating the step of determining the road type and selecting the strategic road segments and the step of storing data related to the selected strategic road segments between the start point and the destination point of the optimum route.

3. A navigation method as defined in claim 1, wherein said step of determining the road type involved in the optimum route and selecting the strategic road segments associated with the optimum route includes a step of detecting a freeway in the optimum route and selecting a freeway ramp as a strategic road segment for the routing data when the freeway ramp either enters or exits the freeway on the optimum route.

4. A navigation method as defined in claim 3, wherein said routing data indicating the optimum route include at least information on absolute locations of end nodes of the strategic road segments associated with the optimum route.

5. A navigation method as defined in claim 1, wherein said routing data indicating the optimum route include at least information on absolute locations of end nodes of the strategic road segments associated with the optimum route.

6. A navigation method as defined in claim 1, wherein said step of reproducing the optimum route by the individual navigation system includes a step of filling-in the routing data with road segments retrieved from the map database of the individual navigation system thereby reproducing the optimum route by the individual navigation system.

7. A navigation method as defined in claim 1, wherein said individual navigation system includes a position detection unit to detect a current position of the individual navigation system where the position detection unit includes at least a GPS (Global Positioning System) receiver for determining the position based on GPS signals from artificial satellites.

8. A navigation method as defined in claim 7, wherein said individual navigation system conducts a route guidance operation to the destination through the optimum route reproduced based on the routing data from the navigation server while comparing the current position detected by the position detection with the optimum route.

9. A navigation method as defined in claim 1, wherein the map data used by the navigation server is updated repeatedly to reflect the most current map information in formation of the optimum route, and a computation power of the navigation server is higher than that of the individual navigation system.

10. A navigation apparatus for using routing data created by a remote navigation server for a route guidance operation by an individual navigation system, comprising:
    a communication device provided in the individual navigation system for sending information on a starting point and a destination point to the navigation server from the individual navigation system through a communication network;
    a route calculation unit provided in the navigation server for establishing an optimum route by the navigation server by conducting a route search algorithm on map data retrieved from a map database of the navigation server;
    said route calculation unit is configured to determine a road type involved in the optimum route and selecting strategic road segments associated with the optimum route;
    a memory device provided in the navigation server for storing data related to the selected strategic road segments while ignoring data related to road segments other than the strategic road segments;
    said route calculation unit is further configured to establish routing data based on the data related to the strategic road segments thereby creating routing data of minimum amount of data;

a communication unit provided in the navigation server for sending the routing data from the navigation server to the individual navigation system through the communication network; and a processor provided in the individual navigation system for reproducing the optimum route by the individual navigation system based on the routing data from the navigation server and map data retrieved from a map database of the individual navigation system;

wherein, when determining the road type involved in the optimum route and selecting the strategic road segments associated with the optimum route, said route calculation unit causes an operation of detecting a surface road in the optimum route and selecting a road segment that changes a direction of the optimum route such that it destroys assumption that the optimum route is a straightest path as a strategic road segment for the routing data.

11. A navigation apparatus as defined in claim 10, wherein said route calculation unit is further configured to repeat a function of determining the road type and selecting the strategic road segments and a function of storing data related to the selected strategic road segments between the start point and the destination point of the optimum route.

12. A navigation apparatus as defined in claim 10, said route calculation unit for determining the road type involved in the optimum route and selecting the strategic road segments associated with the optimum route is further configured to detect a freeway in the optimum route and select a freeway ramp as a strategic road segment for the routing data when the freeway ramp either enters or exits the freeway on the optimum route.

13. A navigation apparatus as defined in claim 12, wherein said routing data indicating the optimum route include at least information on absolute locations of end nodes of the strategic road segments associated with the optimum route.

14. A navigation apparatus as defined in claim 10, wherein said routing data indicating the optimum route include at least information on absolute locations of end nodes of the strategic road segments associated with the optimum route.

15. A navigation apparatus as defined in claim 10, wherein, when reproducing the optimum route by the individual navigation system, said processor causes an operation of filling-in the routing data with road segments retrieved from the map database of the individual navigation system thereby reproducing the optimum route by the individual navigation system.

16. A navigation apparatus as defined in claim 10, wherein said individual navigation system includes a position detection unit to detect a current position of the individual navigation system where the position detection unit includes at least a GPS (Global Positioning System) receiver for determining the position based on GPS signals from artificial satellites.

17. A navigation apparatus as defined in claim 16, wherein said individual navigation system conducts a route guidance operation to the destination through the optimum route reproduced based on the routing data from the navigation server while comparing the current position detected by the position detection with the optimum route.

18. A navigation apparatus as defined in claim 10, wherein the map data used by the navigation server is updated repeatedly to reflect the most current map information in formation of the optimum route, and a computation power of the navigation server is higher than that of the individual navigation system.

* * * * *